Patented Aug. 30, 1932

1,875,062

UNITED STATES PATENT OFFICE

HERBERT A. LUBS, OF PENNS GROVE, NEW JERSEY, ARTHUR L. FOX, OF WILMINGTON, DELAWARE, AND CARROLL C. SMITH, OF PENNS GROVE, NEW JERSEY, ASSIGNORS TO E. I. DU PONT DE NEMOURS & COMPANY, OF WILMINGTON, DELAWARE, A CORPORATION OF DELAWARE

SEPARATION OF ORES AND MINERALS BY FLOTATION

No Drawing. Application filed December 7, 1927. Serial No. 238,456.

This invention relates to the art of separating ores and minerals by flotation and more particularly to a product and process for concentrating ores and minerals which involves the employment, as a separating agent, of the new products obtained by the reaction of a chloride of sulfur on an organic compound.

Numerous reagents have been proposed hitherto for use in the separation of ores and minerals by flotation. These reagents vary widely in their value and effectiveness. The object of the present invention is to provide an improved process for the separation of ores and minerals by flotation through the use of products which are exceedingly effective.

We have found that products obtained by the reaction of the chlorides of sulfur, and particularly sulfur mono chloride, on organic compounds, with or without a catalyst, especially those compounds which do not contain amino groups, are effective as flotation agents. While the products obtained directly by this reaction are adapted for such use, it has been found that the degree of effectiveness varies considerably with the particular compounds employed. In general, their effectiveness will be increased if they are converted to other products which are soluble in water. This may be accomplished, for example, by treating them with a reducing agent such as a solution of a sulfide, for example sodium sulfide, or any other well known reducing agent, as hydrosulfite. The reducing agent may be dissolved either in water or preferably in a solvent such as alcohol.

With some organic compounds the sulfur chloride reaction proceeds readily without a catalyst; pine oil is an example of this.

In other cases, for example with dichlorbenzene, the reaction goes very slowly and can be speeded up by the use of a proper catalyst. With certain other compounds, such for example as benzene, a catalyst appears necessary for any reaction at all.

A number of different catalysts can be used for the reaction, although the exact type of compound formed is, to some extent, dependent on the catalyst. We have found, for example, that both the aluminum-mercury couple and anhydrous aluminum chloride are effective in promoting the reaction. The products obtained in the two cases, which are probably mixtures of compounds, are different, but both give effective flotation agents, for example when treated with an agent such as alcoholic sodium sulfide.

The products we have found to be especially effective as flotation agents include the reaction products of sulfur chloride on such compounds as aliphatic or aromatic hydrocarbons, such for example as benzene, toluene, xylene, or mixtures of such compounds, ethylene, propylene and kerosene, halogenated hydrocarbons such as the chlorbenzenes, phenolic bodies such as phenols and cresols, organic acids such for example as oleic acid, carbohydrates such as glucose or starch, terpenes, and in general many more or less crude products, such as the products of the turpentine industry (for example, pine oil), hard wood oil, sulfite cellulose pitch, blast furnace oil, etc.

We have also obtained very effective products from aldehyde derivatives such as acetal, and from such materials as dibenzyl and paracymene.

It will be obvious from the above that a very large number of organic compounds are suitable for treatment with sulfur chloride to produce flotation agents. Many of such compounds are mentioned herein, but it is clearly impractical to attempt to list all such compounds. However, by a simple and well known test, any chemist will be able to determine whether, in a given case, a compound so obtained is an effective flotation agent. Every organic compound which applicants have treated with sulfur chloride and tested has exhibited to a greater or less degree such properties.

We give below several examples of the preparation of the new type of flotation agents:

Example I

One hundred grams of pine oil (steam distilled) are placed in a container fitted with a mechanical stirrer. The container is surrounded with ice and then 75 g. sulfur mono chloride are added gradually. A violent reaction ensues and large volumes of HCl gas are given off. After all the sulfur chloride is added the stirring is continued an hour and then the mixture allowed to come up to room temperature. It is then refluxed 12 hrs. with 1000 cc. alcohol and 285 g. crystalline sodium sulfide. This solution may then be used as such or the alcohol may be evaporated off and the residue used.

Example II

Using aluminum amalgam as catalyst, 150 g. of dichloro-benzene are placed in a container fitted with a reflux condenser and a mechanical stirrer. Stirring is started and heat is applied to melt the p-dichloro-benzene. Then 1 g. of aluminum-mercury couple (made by immersing aluminum shavings in a solution of mercuric chloride for a few minutes and then washing them with alcohol and ether) is added and 135 g. sulfur mono chloride is added gradually. Large volumes of HCl gas are given off. After the addition is complete the dark colored, thick, reaction product is poured into alcohol. This causes the thick paste to solidify to a light yellow substance. This is then refluxed with 1000 cc. alcohol and 520 g. crystalline $Na_2S$ for 12 hrs. This solution may be employed as such for flotation or the alcohol may be evaporated off and the residue left may be employed.

Example III

In a beaker is placed 300 cc. benzene and 135 g. anhydrous aluminum chloride as a catalyst. Then 135 g. sulfur mono chloride is dissolved in 200 cc. benzene and this is added gradually. A vigorous reaction ensues and external cooling may be necessary. After the reaction is over the mass is poured on ice and the benzene layer separated and the benzene evaporated off. The residue may then be refluxed with 1000 cc. alcohol and 520 g. $Na_2S$ for 12 hrs. This solution may then be used as such or the alcohol may be evaporated and the residue used for flotation.

Example IV

The same procedure is followed as in example 3, except that anhydrous ferric chloride is substituted for anhydrous aluminum chloride.

Flotation tests made on the crude reaction products of indefinite constitution prepared by the general procedure described above, show that they give excellent results. In all cases, as shown by the examples in the tabulation below, the copper content of the tailings is lower than that obtained with potassium ethyl xanthate, a commonly used flotation agent.

The tests were made as follows:

Five hundred grams of copper ore from the Inspiration Consolidated Copper Company were ground in the pebble mill with 450 cc. of water, and 0.35 g. of hydrated lime. This pulp was transferred to a mechanically agitated flotation machine and conditioned therein for 1 minute with pine oil and the sulfur chloride reaction product. Water was then added to give a pulp of approximately 20% solids. This dilution caused circulation of the pulp thru the spitz and froth formation. The froth is removed for 10 minutes.

The results obtained from this operation, using various sulfur chloride reaction products, are tabulated below and compared with the results obtained from the use of the commonly employed xanthate.

|  | Per cent Cu heads | Per cent Cu conct. | Per cent Cu tailings | Per cent Cu recovered |
|---|---|---|---|---|
| Blank test using only pine oil | 0.95 | 2.28 | 0.90 | 7.0 |
| Xanthate with pine oil | 0.95 | 15.80 | 0.37 | 62.2 |
| $S_2Cl_2$ + p-dichlor benzene (with pine oil) | 0.95 | 15.35 | 0.32 | 67.4 |
| $S_2Cl_2$ + o-dichlor benzene (with pine oil) (reduced) | 0.95 | 16.25 | 0.31 | 68.3 |
| $S_2Cl_2$ + p-cymene (with pine oil) (reduced) | 0.95 | 11.58 | 0.29 | 71.0 |
| $S_2Cl_2$ + kerosene (with pine oil) (reduced) | 0.95 | 14.40 | 0.33 | 66.4 |

In all cases the reduced product of the sulfur chloride reaction was employed. It will be noted that the copper content of the tailings is relatively high. This is due to the presence of copper silicate in the ore.

The products of the invention exhibit, to a greater or lesser degree, the property of selective flotation.

Some of these products we find to be unusually effective in depressing iron and raising copper. The material obtained by reacting sulfur chloride on pine oil, and reducing the reaction product with alcoholic sodium sulfide is particularly valuable in this respect.

It will be obvious from the foregoing embodiments and description of our invention that the class of compounds, the properties of which we have discovered, constitutes unusually selective and efficient flotation reagents. These compounds are adapted for use over a wide range of conditions for the differential or selective flotation of complex ores. We believe ourselves to be the first to discover these valuable properties and claim as our invention:

We claim:

1. In the process of concentrating ores and minerals, the step which comprises subjecting the ore in the form of a pulp to a froth flotation operation in the presence of a flotation agent obtained by reacting sulfur chloride on a sulfidizable organic compound not containing an amino group, and thereafter effecting the reduction of the reaction product by treating it with a reducing agent.

2. In the process of concentrating ores and minerals, the step which comprises subjecting the ore in the form of a pulp to a froth flotation operation in the presence of a flotation agent obtained by the reaction of sulfur chloride on a compound containing a sulfidizable hydrocarbon nucleus, but not containing an amino group, and thereafter effecting the chemical reduction of this reaction product to form a water soluble compound.

3. In the process of concentrating ores and minerals, the step which comprises subjecting the ore in the form of a pulp to a froth flotation operation in the presence of a flotation agent obtained by a process involving the reaction of sulfur chloride on an aromatic hydrocarbon and thereafter chemically reducing the reaction product to form a water-soluble compound.

4. In the process of concentrating ores and minerals, the step which comprises subjecting the ore in the form of a pulp to a froth flotation operation in the presence of a product obtained by a process involving the reaction of sulfur chloride on a terpene and thereafter chemically reducing the reaction product to form a water-soluble compound.

5. In the process of concentrating ores and minerals, the step which comprises subjecting the ore in the form of a pulp to a froth flotation operation in the presence of a flotation agent obtained by a process involving the reaction of sulfur mono chloride on a sulfidizable substance consisting substantially of carbon and hydrogen only in the presence of a catalyst, selected from a group comprising the aluminum-mercury couple and anhydrous aluminum chloride.

6. In the process of concentrating ores and minerals, the step which comprises subjecting the ore in the form of a pulp to a froth flotation operation in the presence of a flotation agent obtained by reacting sulfur chloride on a sulfidizable hydrocarbon, and treating this reaction product with an alcoholic solution of sodium sulfide.

7. In the process of concentrating ores and minerals, the step which comprises subjecting the ore in the form of a pulp to a froth flotation operation in the presence of a product obtained by first reacting sulfur chlorine on pine oil, and thereafter effecting the reduction of this reaction product with a reducing agent.

8. In the process of concentrating ores and minerals, the step which comprises subjecting the ore in the form of a pulp to a froth flotation operation, in the presence of a product adapted to raise copper sulfide and depress iron sulfide, said product being obtained by reacting sulfur chloride on a sulfidizable organic compound not containing an amino group, and thereafter effecting the reduction of this compound by treating it with a reducing agent.

9. In the process of concentrating ores and minerals, the step which comprises subjecting the ore in the form of a pulp to a froth flotation operation, in the presence of a product adapted to raise copper sulfide and depress iron sulfide, obtained by reacting sulfur chloride on pine oil and thereafter treating this reaction product with a solution of sodium sulfide.

10. In the process of concentrating ores and minerals, the step which comprises subjecting the ore in the form of a pulp to a froth flotation operation in the presence of a flotation agent obtained by reacting a chloride of sulfur on an organic compound of the class consisting of aliphatic and aromatic hydrocarbons and mixtures thereof, halogenated hydrocarbons, phenolic bodies, organic acids, aldehyde derivatives and the crude products of the turpentine industry, and thereafter effecting the reduction of the resulting compound to render it water-soluble.

11. A product obtainable by reacting a chloride of sulfur on a sulfidizable organic compound not containing an amino group and thereafter effecting the chemical reduction of the resulting compound, said product being soluble in water and adapted to function selectively in the froth flotation of ore pulps.

12. A product obtainable by reacting a chloride of sulfur on a sulfidizable aromatic hydrocarbon not containing an amino group and thereafter effecting the chemical reduction of the resulting compound, said product being soluble in water and adapted to function selectively in the froth flotation of ore pulps.

13. The product obtainable by reacting a chloride of sulfur on pine oil, and thereafter effecting the reduction of the resulting compound, said product being soluble in water and adapted to function selectively in the froth flotation of ore pulps.

14. The product obtainable by reacting a chloride of sulfur on a aromatic hydrocarbon, and thereafter effecting the reduction of the resulting compound, said product being soluble in water and adapted to function selectively in the froth flotation of ore pulps.

15. The product obtainable by reacting a chloride of sulfur on terpene, and thereafter effecting the reduction of the resulting compound, said product being soluble in water and adapted to function selectively in the froth flotation of ore pulps.

16. The product obtainable by reacting a chloride of sulfur on a compound of the class consisting of aliphatic and aromatic hydrocarbons, and thereafter effecting the reduction of the resulting compound, said product being soluble in water and adapted to function selectively in the froth flotation of ore pulps.

17. A product obtainable by a process involving the step of reacting sulfur-monochloride on a compound of the class consisting of sulfidizable aliphatic and aromatic hydrocarbons and thereafter chemically reducing the treated hydrocarbon, said product being soluble in water and adapted to function selectively in the froth flotation of ores.

In testimony whereof we affix our signatures.

HERBERT A. LUBS.
ARTHUR L. FOX.
CARROLL C. SMITH.